(12) United States Patent
Bhushan et al.

(10) Patent No.: US 8,094,740 B2
(45) Date of Patent: Jan. 10, 2012

(54) METHOD OF DETERMINING THE LOCATION OF THE FFT WINDOW AND THE DELAY SPREAD FOR THE PLATINUM BROADCAST CHANNEL ESTIMATOR

(75) Inventors: Naga Bhushan, San Diego, CA (US); June Namgoong, San Diego, CA (US); Peter John Black, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 12/606,009

(22) Filed: Oct. 26, 2009

(65) Prior Publication Data

US 2010/0039925 A1    Feb. 18, 2010

Related U.S. Application Data

(63) Continuation of application No. 11/174,108, filed on Jun. 29, 2005, now Pat. No. 7,609,773.

(60) Provisional application No. 60/672,573, filed on Apr. 18, 2005.

(51) Int. Cl.
*H04L 27/28* (2006.01)
*H03D 1/00* (2006.01)

(52) U.S. Cl. .......... 375/260; 375/343

(58) Field of Classification Search .......... None
See application file for complete search history.

(56) References Cited

U.S. PATENT DOCUMENTS

| | | | |
|---|---|---|---|
| 6,535,502 B1 * | 3/2003 | Brink | 370/345 |
| 6,650,617 B1 * | 11/2003 | Belotserkovsky et al. | 370/210 |
| 6,993,083 B1 | 1/2006 | Shirakata et al. | |
| 7,233,625 B2 | 6/2007 | Ma et al. | |
| 7,251,282 B2 * | 7/2007 | Maltsev et al. | 375/260 |
| 7,308,034 B2 * | 12/2007 | Jeon et al. | 375/260 |
| 7,420,915 B2 * | 9/2008 | Murakami et al. | 370/204 |
| 7,577,087 B2 * | 8/2009 | Palin | 370/210 |
| 2003/0147358 A1 * | 8/2003 | Hiramatsu et al. | 370/281 |

(Continued)

FOREIGN PATENT DOCUMENTS

JP    2005151396    9/2005

(Continued)

OTHER PUBLICATIONS

International Search Report & Written Opinion—PCT/US2006/014041—International Search Authority, European Patent Office, Aug. 22, 2006.

(Continued)

*Primary Examiner* — Khanh C Tran
(74) *Attorney, Agent, or Firm* — Jeffrey Jacobs; Sayed H. Beladi

(57) ABSTRACT

In one embodiment, the invention comprises a channel estimation method, comprising determining a FFT window position, and calculating a delay spread. In another embodiment, the step of determining a FFT window position comprises setting an initial position of the FFT window, computing an energy for each tap, time averaging said energy for each tap, comparing an average energy of each tap with a first threshold multiplied by the average energy of all taps, comparing the average energy of each tap with a second threshold multiplied by a maximum average energy in alias components, updating the set of paths if the average energy of the tap is greater than said second threshold multiplied by the maximum average energy in alias components; and refining the FFT window position.

16 Claims, 10 Drawing Sheets

U.S. PATENT DOCUMENTS

| | | | |
|---|---|---|---|
| 2004/0005018 A1* | 1/2004 | Zhu et al. | 375/340 |
| 2005/0036564 A1 | 2/2005 | Peter et al. | |
| 2005/0063298 A1 | 3/2005 | Ling et al. | |
| 2006/0018413 A1 | 1/2006 | Gupta | |
| 2006/0165197 A1 | 7/2006 | Morita et al. | |
| 2006/0176802 A1* | 8/2006 | Ko et al. | 370/208 |

FOREIGN PATENT DOCUMENTS

| | | |
|---|---|---|
| KR | 20020011096 | 2/2002 |
| KR | 20040032987 | 4/2004 |
| TW | 522694 | 3/2003 |
| TW | 561338 | 11/2003 |
| WO | WO2005022797 | 3/2005 |
| WO | WO2006113419 | 10/2006 |

OTHER PUBLICATIONS

Chen N. et al: "OFDM timing Synchronisation Under Multi-path Channels", IEEE Vehicular Tehcnology Conference, New York, NY: IEEE US, vol. 4 of 4. Conf. 57, Apr. 22, 2003, pp. 378-382.

Taiwanese Search report—095113829—TIPO—Sep. 25, 2009.

* cited by examiner

METHOD OF DETERMINING THE LOCATION OF THE FFT WINDOW AND THE DELAY SPREAD FOR THE PLATINUM BROADCAST CHANNEL ESTIMATOR

CLAIM OF PRIORITY UNDER 35 U.S.C. §119

The present Application for Patent claims priority to application Ser. No. 11/174,108 entitled "METHOD OF DETERMINING THE LOCATION OF THE FFT WINDOW AND THE DELAY SPREAD FOR THE PLATINUM BROADCAST CHANNEL ESTIMATOR", filed Jun. 29, 2005, and Provisional Application No. 60/672,573 filed Apr. 18, 2005, and assigned to the assignee hereof and hereby expressly incorporated by reference herein.

BACKGROUND

1. Field

The present invention relates generally to a method and apparatus for synchronizing a multiple access system. More specifically, the present invention relates to a novel and improved method and apparatus to synchronizing a Code Division Multiple Access (CDMA) system, an Orthogonal Frequency Division Multiplexing (OFDM) system or a hybrid of two such systems.

2. Background

In the prior art, either CDMA searcher information or Orthogonal Frequency Division Multiplexing (OFDM) channel estimation information is used for synchronization. A CDMA searcher looks for sectors and paths. By identifying the arrival time of various paths from various sectors, the CDMA searcher correlates the received signal with the pilot signal. Paths can be differentiated based on the differences in chip delay. i.e., different paths have different delays.

With ODFM channel estimation, all of the paths are represented by an impulse response, ^h. Channel estimates may be used to combine the paths. The channel delay spread is the span or width of the impulse response which equals the difference between the maximum and minimum path delays.

OFDM is a multicarrier transmission technique, which divides the available spectrum into many carriers. High-speed data signals are divided into tens or hundreds of lower speed signals. These lower speed signals are transmitted in parallel over respective frequencies within a Radio Frequency (RF) signal that are known as sub-carrier frequencies ("sub-carriers"). Each subcarrier is modulated by one of the low rate data streams. Thus, the ODFM signal is a sum of many signals with different subcarrier frequencies.

In addition, all of the carriers are orthogonal to one another. Because the carriers are orthogonal, each carrier has an integer number of cycles over a symbol period. Due to this, the spectrum of each carrier has a null at the center frequency of each of the other carriers in the system. See FIG. 1. As a results, there is minimal interference between the carriers, allowing then to be spaced as close as theoretically possible.

A discrete Fourier transform is used for baseband processing of the OFDM signal. The discrete Fourier transform is implemented as an Inverse Fast Fourier Transform (IFFT) and a Fast Fourier Transform (FFT) that modulates and demodulates parallel data blocks, respectively. The set of subcarriers generated during one transform defines an OFDM symbol. The subcarriers are serially transmitted over the channel of the time samples generated by the IFFT. The duration of the OFDM symbol, which is the same as that of the subcarrier symbol, is thus equal to the time window of the transform.

Generating an OFDM signal in this manner ensures that the OFDM signal will retain its subcarrier orthogonality property when transmitted through a nondispersive channel. However, most channels are dispersive. Thus, significant time and/or frequency dispersion are introduced into the transmitted signal. These impairments introduce Intercarrier Interference (ICI) and Intersymbol Interference (ISI) and which can destroy the orthogonality of the subcarriers.

To protect against time dispersions including multipath, a guard interval equal to the length of the channel impulse response is introduced between successive OFDM symbols. The cyclic extended OFDM symbol thus consists of a guard interval and a useful part in which information is transmitted. The guard interval is commonly implemented by cyclic extension of the IFFT output (i.e., cyclic retransmission of part of the periodic transform). To maintain transmission efficiency, system designers typically endeavor to limit the guard interval to less than one quarter of the useful OFDM symbol duration.

FIG. 2 is a block diagram of a typical OFDM transmitter according to the prior art. An OFDM transmitter 10 receives a stream of baseband data bits 12 as its input. These input data bits 12 are immediately fed into an encoder 14. Encoder 14 typically uses a block and/or convolutional coding scheme to introduce error-correcting and/or error-detecting redundancy into the input bits 12.

In an OFDM communication system, data is communicated in a series of time domain bursts. To form each time domain burst, an IFFT is applied by a Digital Signal Processor (DSP) 16 to a group of frequency domain symbols producing digital time-domain OFDM symbols. DSP 16 also performs additional spectral shaping on the digital time-domain OFDM symbols. In addition, it adds a cyclic prefix or guard interval Next, the digital time-domain OFDM symbols are converted to an analog signal in a digital-to-analog converter 20 and then converted to an Intermediate Frequency (IF) in IF transmitter 42. This composite IF OFDM signal is then passed into Radio Frequency (RF) transmitter 40 which then upconverts the IF OFDM signal to a desired selectable carrier frequency prior to final amplification and propagation across a transmission medium. Upconversion is typically achieved by mixing the IF signal with a variable frequency oscillator signal. The carrier frequency is varied by varying the oscillator frequency.

FIG. 3 illustrates that an OFDM signal is transmitted as blocks of user data separated by guard intervals known as cyclic prefixes. A cyclic prefix is a copy of a portion of an adjacent block of user data and is used to reduce Inter-Symbol Interference (ISI) caused by multipath fading. More particularly, only cyclic prefixes, as opposed to user data, are affected by ISI, as is known by those skilled in the art. Thus the removal of cyclic prefixes by an OFDM receiver removes the effects of ISI from the received OFDM signal.

In the prior art, CDMA systems have synchronized using CDMA searcher information, while ODFM systems have achieved synchronization using discrete frequency-domain channel estimator information. A CDMA searcher uses Pseudo Noise (PN) correlation to identify multipaths and multiple sectors. An OFDM channel estimator uses the frequency response at the pilot tone locations to identify the channel impulse response. However, a CDMA searcher is less effective when detecting weak or low power signals. If a multipath component is not detected, it will not be included in the signal demodulation and interference suppression. As a result, the signal-to-noise ratio will be lower. On the other hand, OFDM channel estimation suffers from aliasing if the channel delay spread exceeds the number of pilot tones. This is the case even if the pilot tones of adjacent OFDM symbols are staggered, so as to admit channel estimation whose length is twice the number of pilot tones.

SUMMARY

In view of the above, the described features of the present invention generally relate to one or more improved systems, methods and/or apparatuses for communicating speech or data on multipath channels.

In one embodiment, the invention comprises a channel estimation method, comprising determining a FFT window position, and calculating a delay spread.

In another embodiment, the step of determining a FFT window position comprises setting an initial position of the FFT window, computing an energy for each tap, time averaging said energy for each tap, comparing an average energy of each tap with a first threshold multiplied by the average energy of all taps, comparing the average energy of each tap with a second threshold multiplied by a maximum average energy in alias components, updating the set of paths if the average energy of the tap is greater than said second threshold multiplied by the maximum average energy in alias components; and refining the FFT window position.

In another embodiment, the present invention comprises a receiver to estimate a channel, comprising an RF receiver having an input and an output, an IF receiver having an input and an output, wherein the input is operably connected to an output of the RF receiver, an analog-to-digital converter having an input and an output, wherein the input is operably connected to the output of the IF receiver, a decoder having an input and an output, and a processor having an input and an output, wherein the input is operably connected to the output of the analog-to-digital converter and the output is operably connected to said input of the decoder and the processor comprises memory, and software comprising instructions stored in the memory, wherein the receiver is adapted to execute the instructions stored in the memory comprising determining a FFT window position, and calculating a delay spread.

In another embodiment, the present invention comprises a processor to estimate a channel, comprising memory, and software comprising instructions stored in said memory, wherein the processor is adapted to execute the instructions stored in the memory comprising determining a FFT window position, and calculating a delay spread.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE DRAWINGS

The word "illustrative" is used herein to mean "serving as an example, instance, or illustration." Any embodiment described herein as "illustrative" is not necessarily to be construed as preferred or advantageous over other embodiments.

The present method and apparatus is applicable to a system where CDM and OFDM waveforms are time-division multiplexed in the same transmit signal. The present method and apparatus uses both CDMA searcher information and channel estimation to improve the synchronization performance in the presence of unconstrained delay spread by synchronizing the OFDM symbols and determines the channel spread delay for channel estimation. It combines both the CDMA searcher information from the CDMA pilot and the channel estimates from OFDM pilot tones. Furthermore, the present method and apparatus uses OFDM channel estimation to detect weak paths and a CDMA searcher for alias resolution.

For ODFM channel estimation, pilot tones are inserted into the signal. Pilot tones contain known data at certain known frequencies. An OFDM communication apparatus calculates a frequency response estimated value of the propagation path by performing time-frequency conversion on a reception signal through an FFT circuit. In addition, it performs a complex multiplication on the received signal with the pilot symbol whose value is known to the receiver. This provides an estimate of the channel frequency response at the frequency associated with the pilot tone. By measuring the channel at the known frequencies and performing an IFFT on the pilot signal, the timing can be inferred. With the above approach, an OFDM symbol with P pilot tones can be used to estimate up to P taps in the channel impulse response. Suppose the position of the pilot tones in adjacent tones are staggered with respect to (w.r.t.) to each other. If the pilot positions alternate between two configurations on even and odd pilot tones, then we may exploit the staggered structure to estimate a channel impulse response of length 2P taps. While this approach works well at low Doppler spread (slow fading channels), the estimation procedure may induce uncanceled alias taps with a separation of the P chips at high Doppler spread (fast fading channels). In either case, if the channel impulse response exceeds a length of P taps, then the OFDM channel estimator is unable to distinguish between causal and anti-causal channel taps in the channel impulse response. The present invention proposes methods to mitigate the uncanceled alias problem for channels with high Doppler, and solves the causal/anti-causal tap resolution problem for channels with large delay spread.

Figure 1:
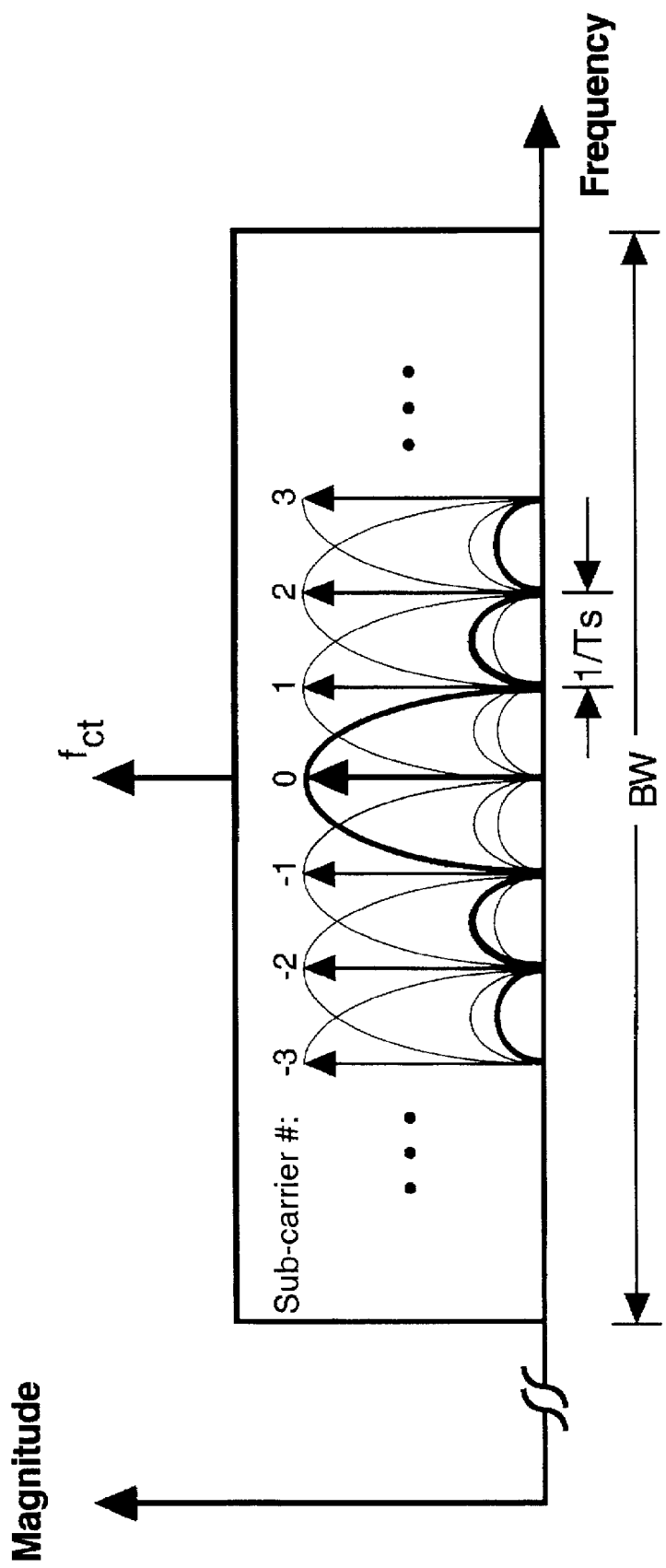
FIG. 1 is an illustration of a typical OFDM signal within an OFDM channel bandwidth showing the frequency domain positioning of OFDM sub-carriers according to the prior art.
Figure 2:
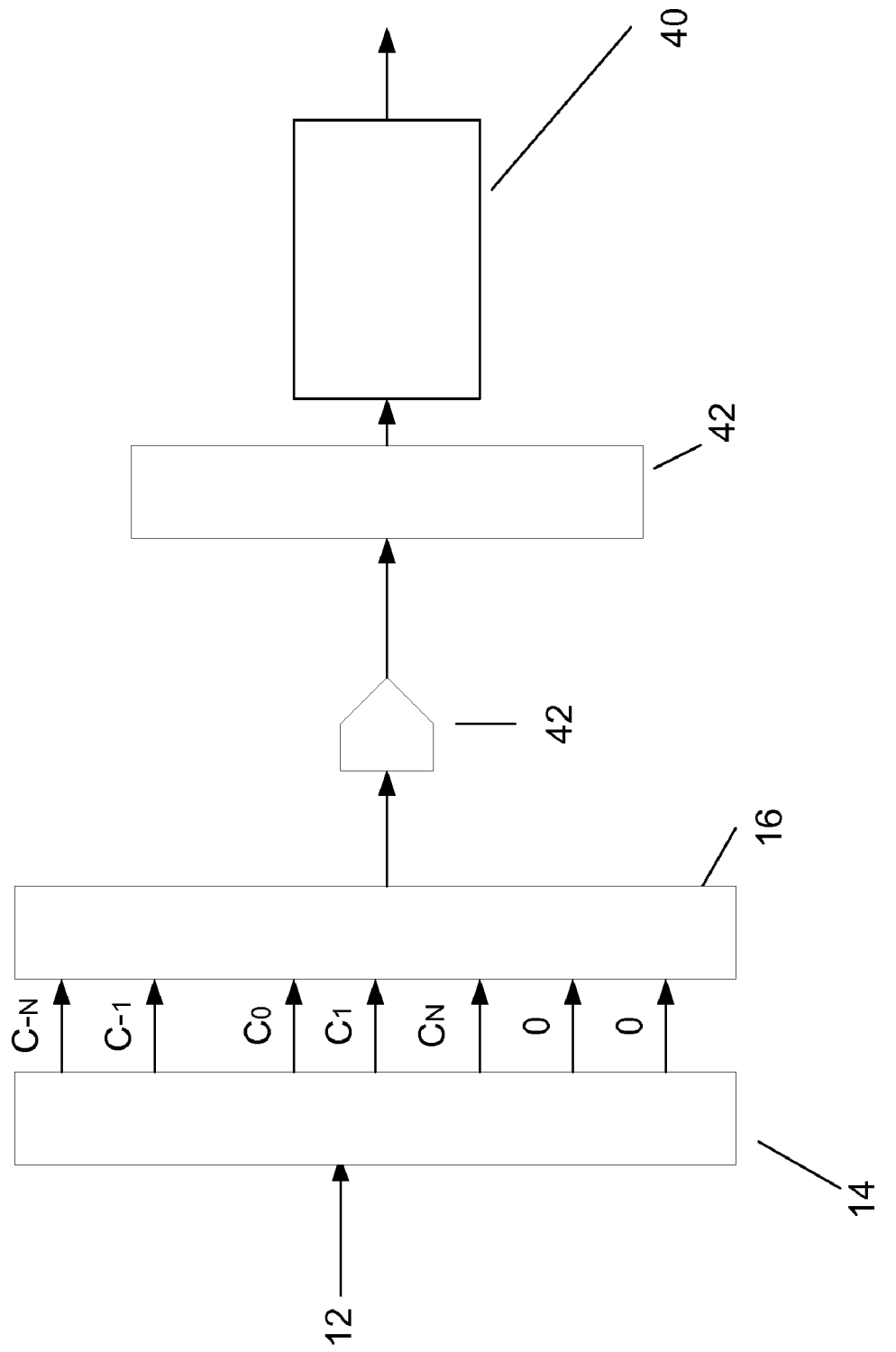
FIG. 2 is a block diagram of a typical OFDM transmitter according to the prior art.
Figure 3:
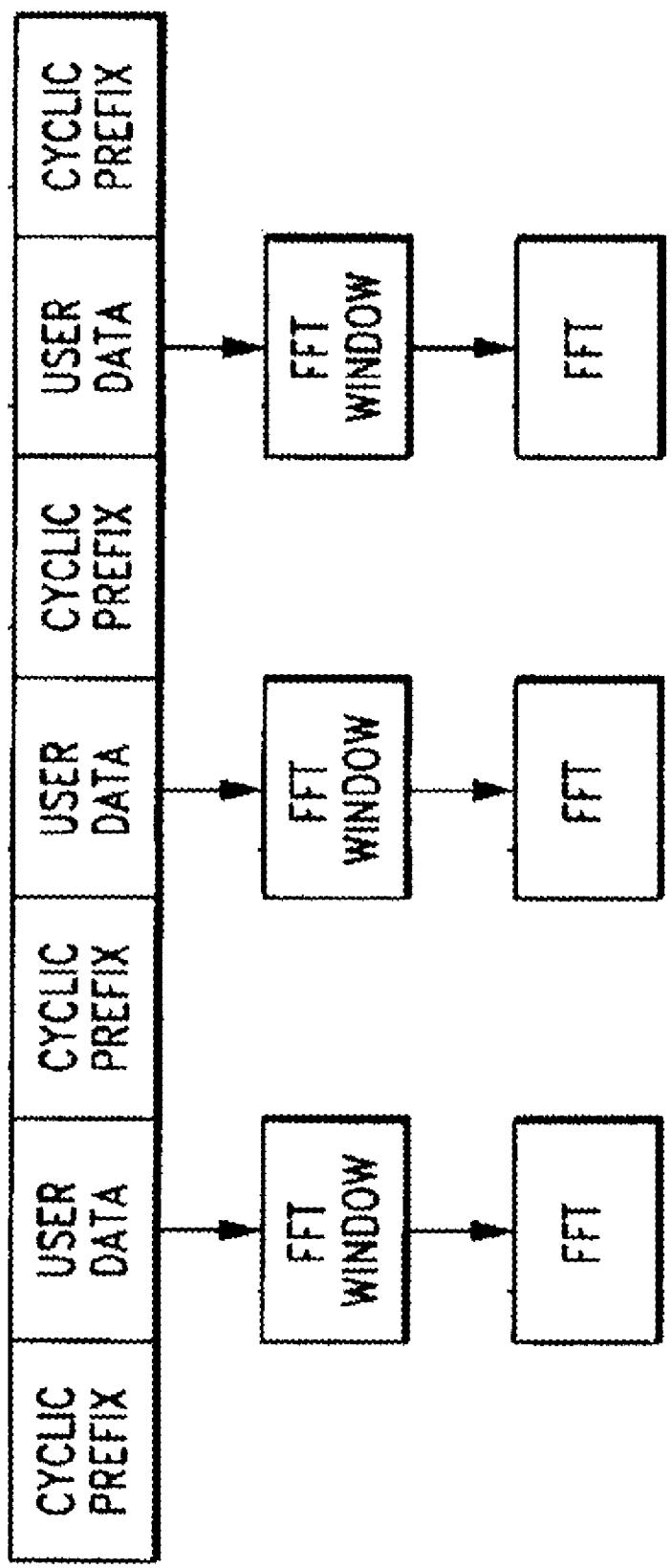
FIG. 3 is an illustration of an OFDM signal according to the prior art.
Figure 4:
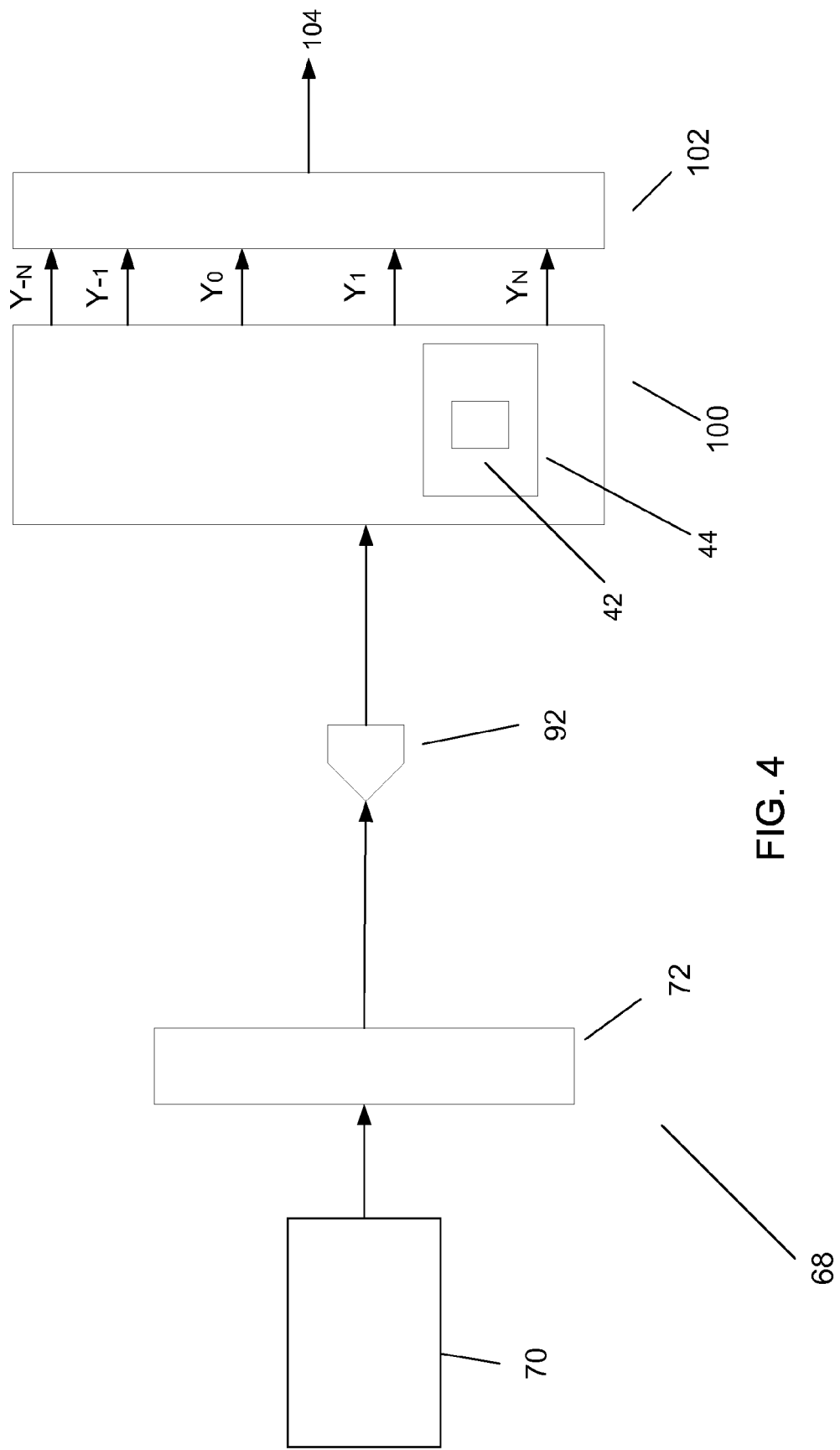
FIG. 4 is a block diagram of the OFDM receiver of the present invention.
Figure 5:
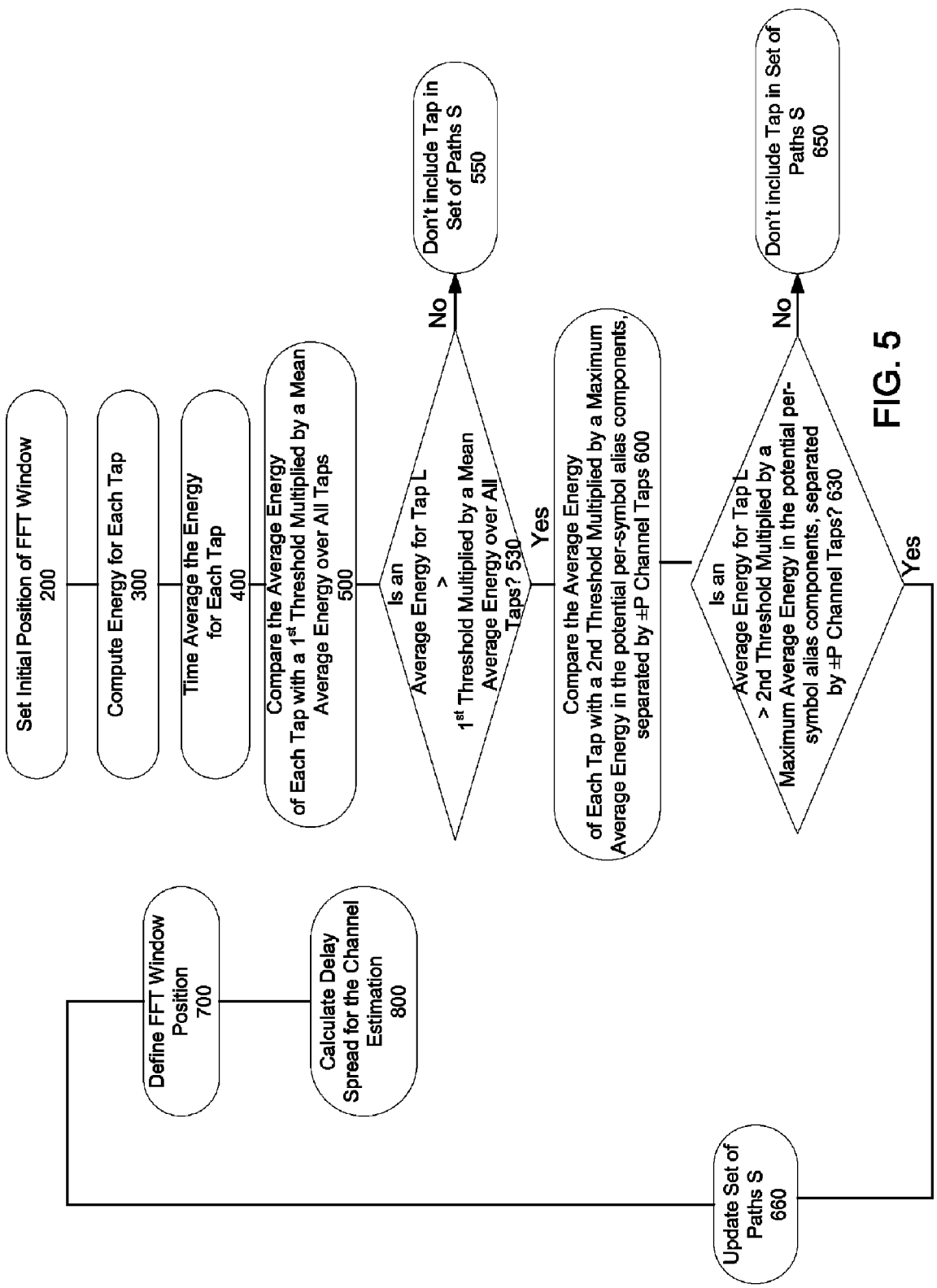
FIG. 5 is a top level flowchart disclosing steps taken by the present method and apparatus.
Figure 6:
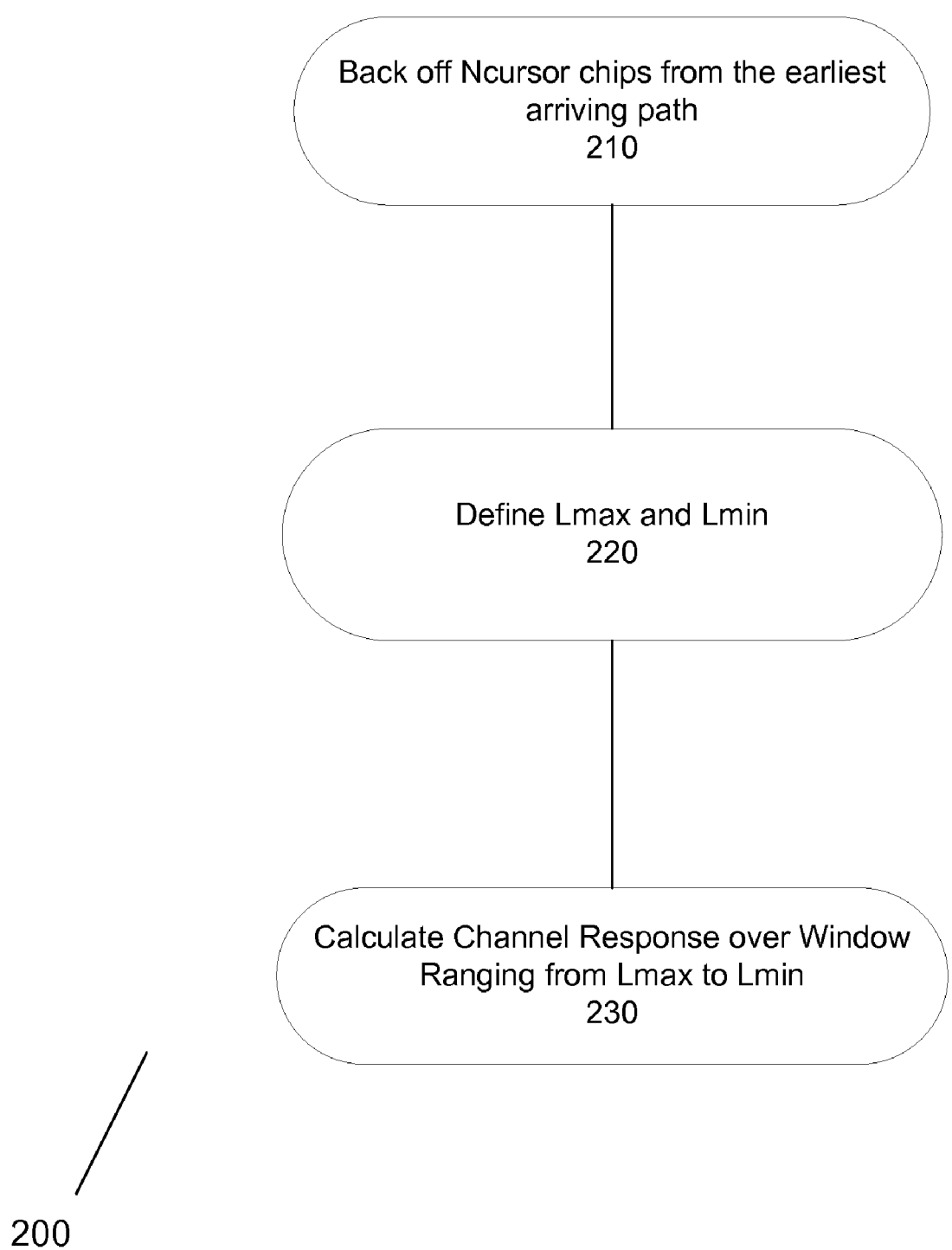
FIG. 6 is a flowchart which discloses the steps taken when setting the initial position of the FFT window.
Figure 7:
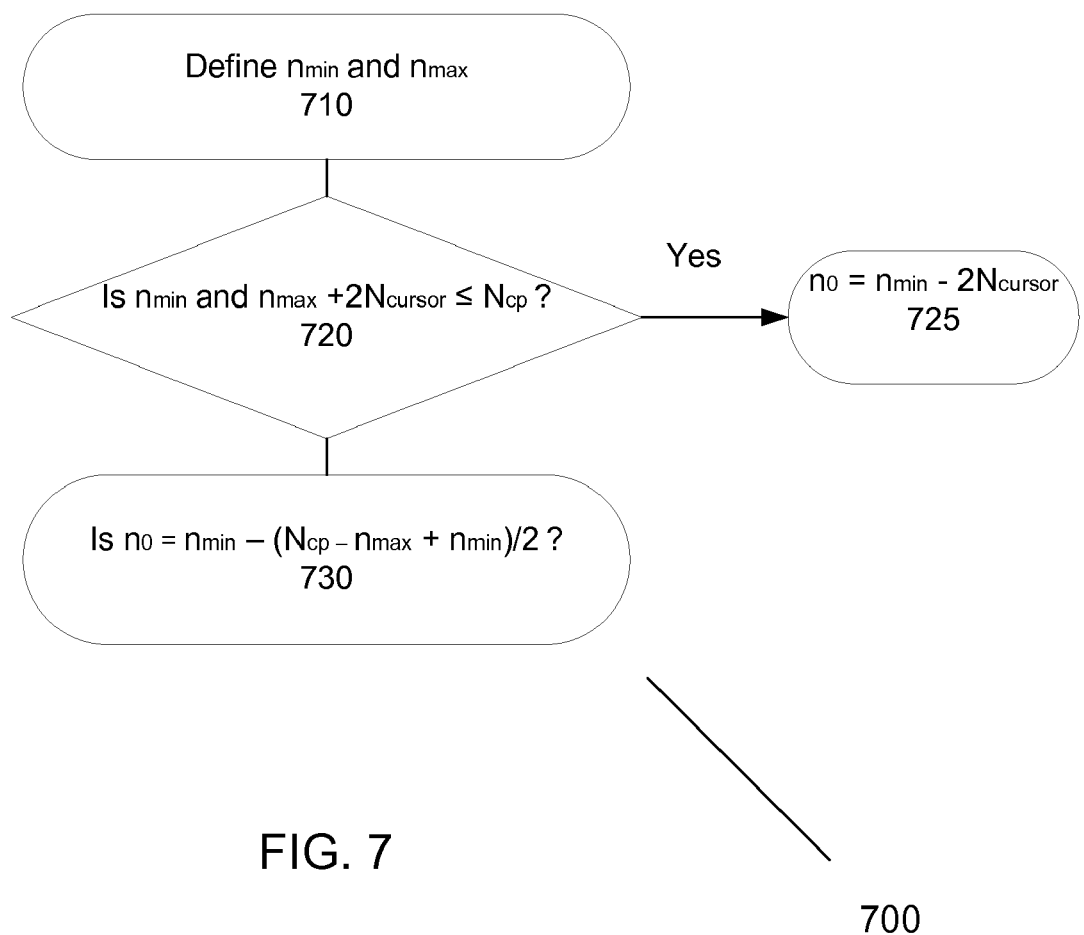
FIG. 7 is a flowchart which discloses the steps taken to refine the FFT window position.
Figure 8:
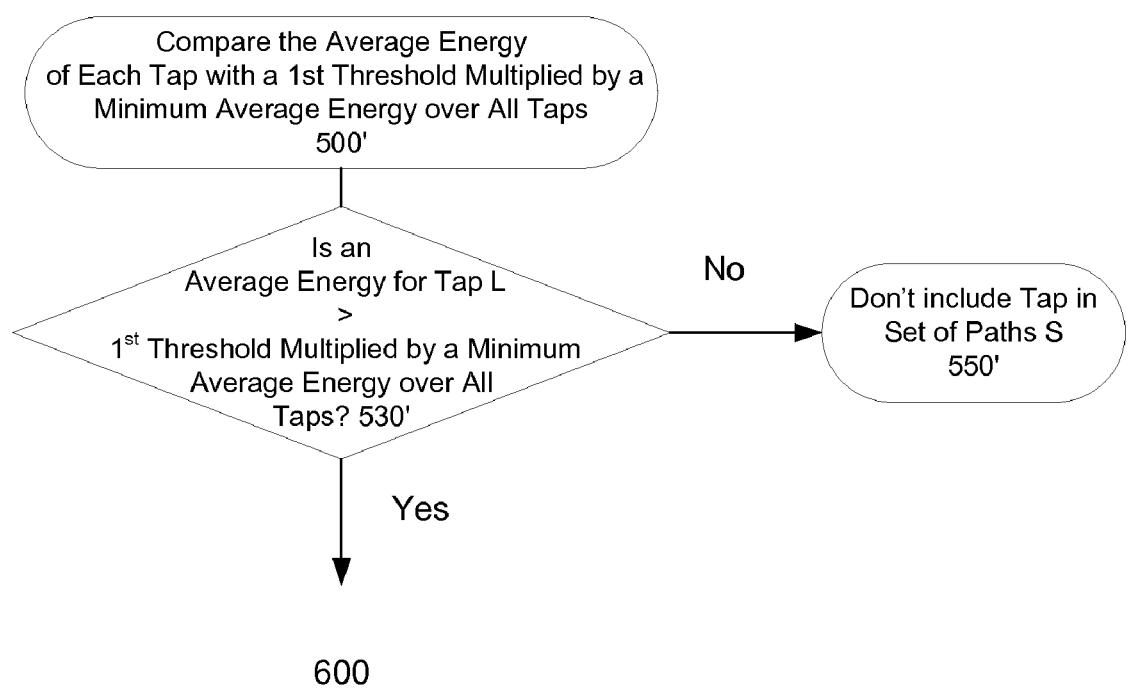
FIG. 8 is a flowchart which discloses the steps taken in an embodiment in which the average energy of each tap is compared with a first threshold multiplied by the minimum average energy of all the taps.
Figure 9:
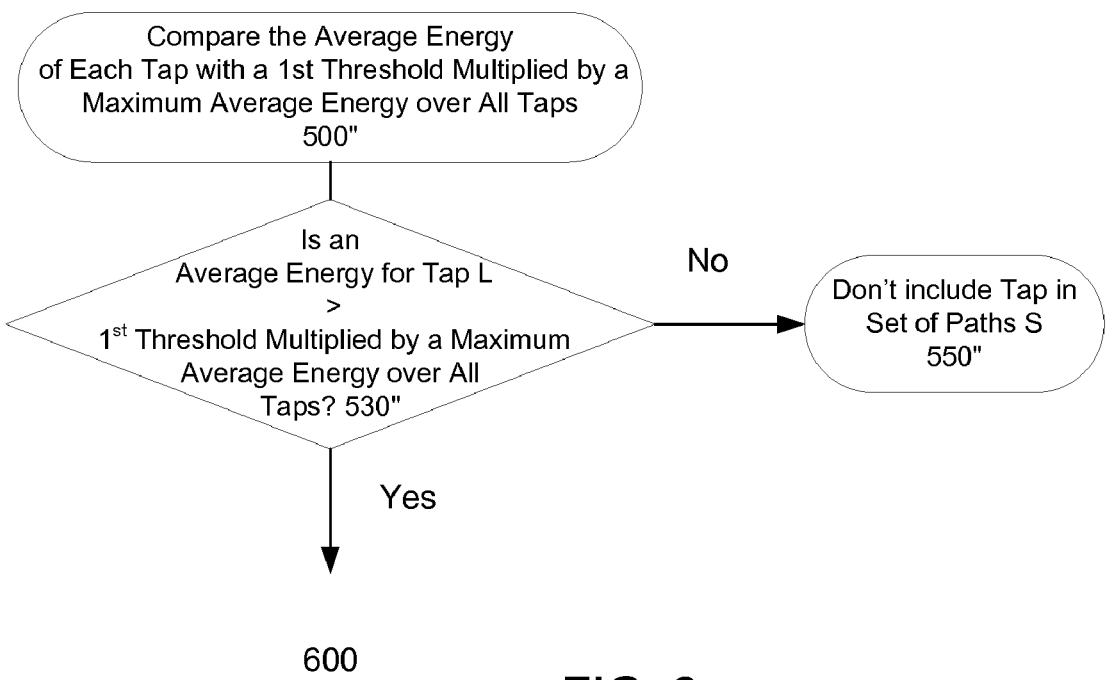
FIG. 9 is a flowchart which discloses the steps taken in an embodiment in which the average energy of each tap is compared with a first threshold multiplied by the maximum average energy of all the taps.

FIG. 4 is a block diagram of an OFDM receiver 68 according to the present invention. At the OFDM receiver 68 an RF receiver 70 downconverts the RF OFDM-modulated carrier to obtain a received IF OFDM signal. The received IF OFDM signal is downconverted to IF from the carrier frequency in an IF receiver 72. The OFDM signal is then passed into an Analog-to-Digital Converter (ADC) 92, respectively, where it is digitized. Next, the cyclic prefix is removed and an FFT is applied to recover the original frequency domain symbols in the DSP/FFT processor 100.

Decoder 102 recovers the transmitted data bits from the sequences of frequency-domain sub-symbols that are delivered to it from DSP 100. The decoder 102 decodes the frequency-domain sub-symbols to obtain a stream of data bits 104. The data bits 104 should match the stream of data bits 12 that were fed into the OFDM transmitter 10.

The OFDM receiver 68 determines the exact timing of the beginning of each symbol within a data frame to properly receive the OFDM signal that has been transmitted across a channel and to demodulate the symbols from the received signal. If correct timing is not known, the receiver 68 may not be able to reliably remove the cyclic prefixes and correctly isolate individual symbols before computing the FFT of their samples. When this occurs, sequences of sub-symbols demodulated from the OFDM signal may be incorrect, and the transmitted data bits may not be accurately recovered.

The following steps are taken by the present channel estimation method and apparatus to determine the FFT window position and the channel delay spread. In FIG. 4, the DSP 100 of the present invention is shown as including memory 44. The steps discussed below and disclosed in the flowcharts of FIGS. 5-9 are stored as instructions located in software or firmware 42 located in memory 44. The memory 44 can be located in the processor 100 or separately.

Setting the Initial Position of FFT Window (200)

The first step of the present method and apparatus involves setting the initial position of the FFT window. Let $d_{first}$ be the timing of the earliest, or first path, identified by the searcher, and $d_{last}$ be that of the last path. Based on the searcher results, back off $N_{cursor}$ chips from the earliest arriving path 210. The back-off is used to account for the spreading effect of the pulse shaping filters, the transmit shaping filter and the receiver matched filter, which shape the spectrum of the waveform so that it is consistent with the spectral mask. Thus, $N_{cursor}$ is the assumed length of the precursor (or post-cursor) due to pulse shaping. In one embodiment, $N_{cursor}$ (which can also be referred to as $N_{backoff}$) is 6 chips. This is the starting point of the FFT.

Next, define parameters Lmax and Lmin 220:

Lmax=($N_{cursor}$+max($N_{cp}$, $\Delta d$+$K_+$), 2P-$K_-$)-1, where Ncp is the number of cyclic prefix chips. The cyclic prefix is specific to an ODFM waveform. It consists of extra chips used in the transmit waveform to ensure the orthogonality of tones in a time-dispersive manner. P is the number of pilot tones per ODFM symbol. In one embodiment, the number of pilot tones=64, where the total number of ODFM tones=320. In a second embodiment, P=40 for the 360 tone mode. $K_+$ and $K_-$ are constants. In one embodiment, both $K_+$ and $K_-$ equal 16 chips. $\Delta d$=$d_{last}$-$d_{first}$. Lmax is the index of the last significant component in the estimated channel impulse response.

Lmin=Lmax-(2P-1). Lmin is the index of the first significant component in the estimated channel impulse response.

Next, calculate the channel impulse response from its frequency response (measured on the OFDM pilot tones that are staggered on adjacent OFDM symbols), by assuming that the channel impulse response is confined to the delay range [Lmin, Lmax]. In this manner, the CDMA searcher is used to resolve the causal and anti-causal components of the channel impulse response.

The estimated channel impulse over a window ranging in size from Lmin to Lmax ^h(Lmin:Lmax), where the impulse function ^h is calculated for each value of L from Lmin to Lmax 230. h(Lmin) represents the channel impulse response at the minimum or beginning point of the window. h(Lmax) represents the channel impulse response at the maximum or ending point of the window. This will yield 2P tap time-domain channel estimates if the difference between Lmin and Lmax=2P. In one embodiment. P=64 and the total number of taps=128.

Compute the Energy for Each Tap (300)

Next, compute the energy for each tap from i=Lmin to i=Lmax using the formula:

E(Lmin:Lmax)=|^h(Lmin:Lmax)|², where |^h(Lmin:Lmax)|² represents the squared absolute values of the impulse response for that channel from i=Lmin to Lmax.

Time Average the Energy for Each Tap (400)

Next, time average the energy for each tap from i=Lmin to i=Lmax by using a 1-tap IIR filter represented by the formula, (1-1/Tc)*AveE(Lmin:Lmax)+1/Tc*E(Lmin:Lmax) with time constant Tc, expressed in units of the OFDM channel estimate update interval.

$$AveE(Lmin:Lmax)=(1-1/Tc)*AveE(Lmin:Lmax)+1/Tc*E(Lmin:Lmax).$$

Tc is inversely proportional to the filter bandwidth BW. The larger the Tc, the smaller the bandwidth BW, which represents better noise rejection along with slower tracking.

Compare the Average Energy of Each Tap with a First Threshold Multiplied by the Mean Average Energy Over All the Taps (500)

Compare the average energy each tap, L, with a first threshold $\theta_1$ multiplied by the mean average energy over all the taps, Lmin to Lmax, where [1/(Lmax-Lmin+1)×ΣAveE(i) for i=Lmin to Lmax] equals the mean average energy over all the taps.

$$AveE(L)>\theta_1 \times [1/(Lmax-Lmin+1)\times \Sigma AveE(i) \text{ for } i=Lmin \text{ to } Lmax].$$

Determine if the average energy for tap L, AveE(L), is greater than first threshold $\theta_1$ multiplied by the mean average energy over all the taps 530. If the average energy for tap L, AveE(L), is greater than first threshold $\theta_1$ multiplied by the mean average energy over all the taps, a second comparison is made. If the energy for tap L, AveE(L), is less, then that tap is not included in the set of paths, S, used to compute the signal 550.

Compare the Average Energy of Each Tap with a Second Threshold Multiplied by the Maximum Average Energy in the Potential Per-Symbol Alias Components, Separated by ±P Channel Taps (600)

Next, compare the average energy each tap, L, with a second threshold $\theta_2$ multiplied by the maximum average energy in the potential per-symbol alias components, separated by ±P channel taps, where [1/(Lmax-Lmin+1)×Max (AveE(L+P), AveE(L-P))] equals the maximum average energy in the potential per-symbol alias components, separated by ±P channel taps.

$$\text{Ave}E(L) > \theta_2 \times [1/(L\text{max}-L\text{min}+1) \times \text{Max}(\text{Ave}E(L+P), \text{Ave}E(L-P))].$$

This threshold test helps to eliminate ghost paths at L resulting from uncanceled alias components associated with the $(L+P)^{th}$ or $(L-P)^{th}$ channel tap in the actual channel impulse response. Uncanceled alias components may be induced by rapid channel variation between adjacent OFDM symbols in a high Doppler spread channel Determine if the average energy for tap L, AveE(L), is greater than the second threshold $\theta_2$ multiplied by the maximum average energy in the potential per-symbol alias components, separated by ±P channel taps 630. If the energy for tap L, AveE(L), is less, then that tap is not included in the set of paths, S, used to compute the signal 650. If the average energy for tap L, AveE(L), is greater, then that tap is included in the set of paths, S, used to compute the signal. Thus, S is updated to include this path 660.

In one embodiment, $\theta_1 = -22$ db and $\theta_2 = -17$ db.

Define the Final FFT Window Position (700)

Define $n_{min} = \min\{S\}$ and $n_{max} = \max\{S\}$, where $n_{min}$ is the earliest path location in set S, $n_{max}$ is the latest path location in set S, and S=the set of paths included when calculating the signal (710). $n_{min}$ determines the starting point of the FFT window on the receiver side.

If $n_{max} - n_{min} + 2N_{cursor} \leq N_{cp}$ (720), then the starting point for FFT position is $$n_0 = n_{min} - N_{cursor}(725)$$

If not, then the starting point for FFT position is $$n_0 = n_{min} - (N_{cp} - n_{max} + n_{min})/2(730)$$

Calculate Delay Spread for the Channel Estimation (800)

The delay spread for the channel estimation is calculated using the following formula:

$$\hat{L} = n_{max} - n_{min} + 2N_{cursor}$$

Alternatively, greater noise suppression can be achieved in the channel estimator by zeroing out the nonsignificant channel taps. This can be achieved by including the taps corresponding to only the precursors and postcursors around the taps in S.

Another Embodiment in which the Average Energy of Each Tap is Compared with a First Threshold Multiplied by the Minimum Average Energy Over All the Taps (500')

Step 500 in the above method can be replaced by step 500' in which the average energy each tap, L, is compared with a first threshold $\beta_1$ multiplied by the minimum average energy over all the taps, Lmin to Lmax, where min {AveE(i)} equals the minimum average energy over all the taps.

$$\text{Ave}E(L) > \beta_1 \times \min\{\text{Ave}E(i)\} \text{ for } L\text{min} \leq i \leq L\text{max}.$$

Determine if the average energy for tap L, AveE(L), is greater than the first threshold $\beta_1$ multiplied by the minimum average energy of all the taps 530'. If the average energy for tap L, AveE(L), is greater than first threshold $\beta_1$ multiplied by the minimum average energy over all the taps, a second comparison is made. If the energy for tap L, AveE(L), is less, then that tap is not included in the set of paths, S, used to compute the signal because the signal will be below the noise floor and is too weak to use 550'.

Another Embodiment in which the Average Energy of Each Tap is Compared with a First Threshold Multiplied by the Maximum Average Energy Over All the Taps (500")

Step 500 in the above method can be replaced by step 500" in which the average energy each tap, L, is compared with a first threshold $\Omega_1$ multiplied by the maximum average energy over all the taps, Lmin to Lmax, where max {AveE(i)} equals the maximum average energy over all the taps.

$$\text{Ave}E(L) > \Omega_1 \times \max\{\text{Ave}E(i)\} \text{ for } L\text{min} \leq i \leq L\text{max}.$$

Determine if the average energy for tap L, AveE(L), is greater than the first threshold $\Omega_1$ multiplied by the maximum average energy over all the taps 530". If the average energy for tap L, AveE(L), is greater than first threshold $\Omega_1$ multiplied by the maximum average energy over all the taps, a second comparison is made. If the energy for tap L, AveE(L), is less, then that tap is not included in the set of paths, S, used to compute the signal 550". This insures that paths with weak signals are not selected.

Revise the Initial FFT Window Position Using the Energy Window Hypothesis (450)

In this embodiment, it is assumed that the actual span of the channel impulse response is less than P taps from the location of the initial tap location, which is unknown to the receiver. In this embodiment, the energy window hypothesis, called hyp ($\tau$), is defined. The energy over a window whose starting point is $\tau$ chips from Lmin and ending point is Lmin+$\tau$+P−1 (modulo 2P) may be represented by the equation:

$$\text{hyp}(\tau) = \Sigma \text{Ave}E((i-L\text{min})\text{mod } 2P + L\text{min}) \text{ for } i = L\text{min}+\tau \text{ to } L\text{min}+\tau+P-1.$$

The estimates of Lmin and Lmax may be revised as follows:

$$L\text{min}' = L\text{min} + \text{argmax}\{\text{hyp}(\tau)\}, L\text{max}' = L\text{min}' + P - 1.$$

Block 500 and all the subsequent steps may be executed with these revised values of Lmin' and Lmax', in place of the original Lmin and Lmax.

Figure 10:
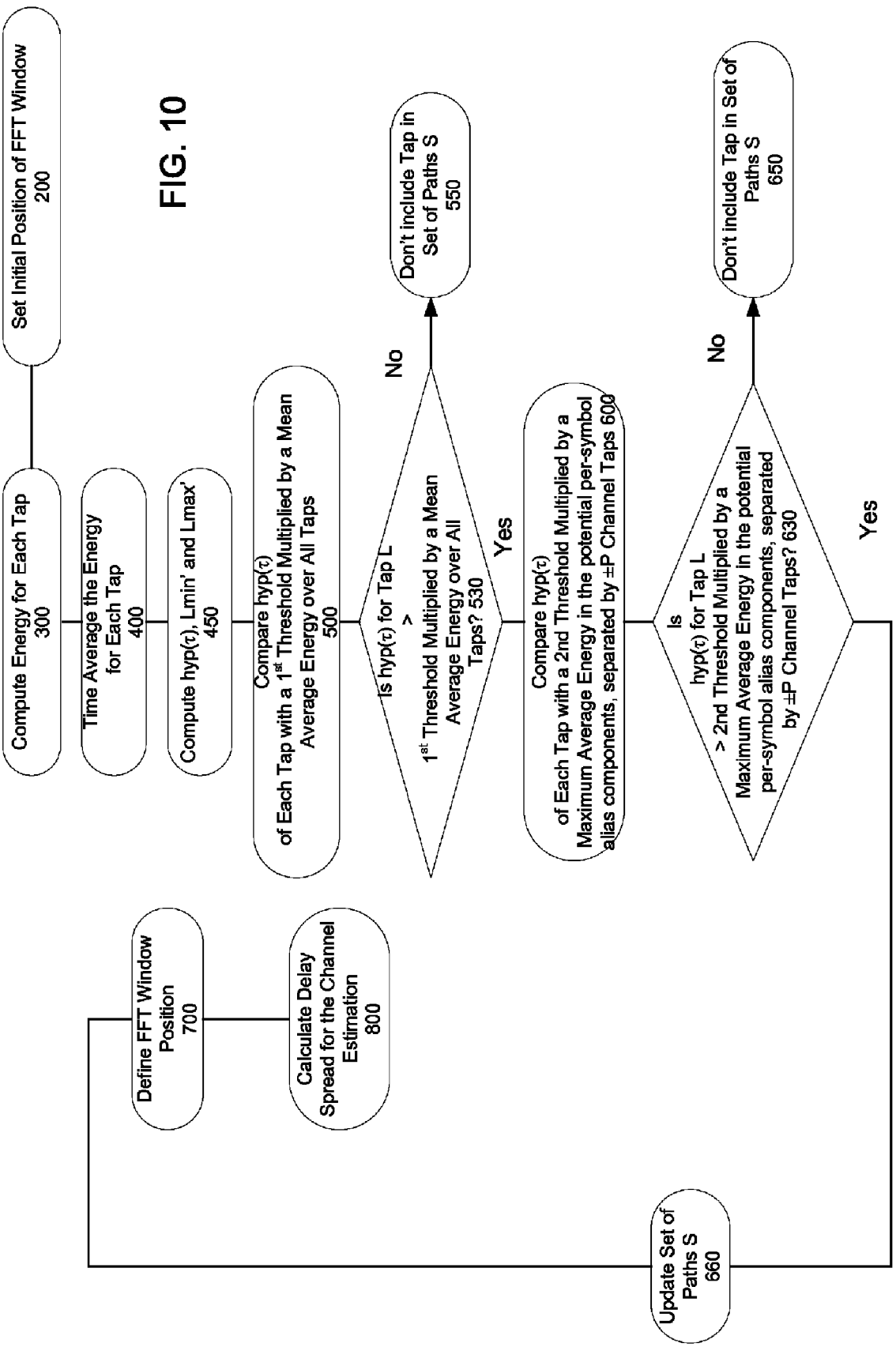
FIG. 10 is a flowchart which discloses the steps taken in an embodiment in which an energy window hypothesis called hyp($\tau$) is used to revise initial FFT window estimates Lmin' and Lmax' which are then used in conjunction with AveE(L) to determine the channel estimation and FFT window positions.

It is noted that this block 450 is an optional block. See FIG. 10.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
   receiving a code divisional multiplexed (CDM) waveform in a signal;
   receiving an orthogonal frequency division modulation (OFDM) waveform in the signal, wherein the CDM waveform and the OFDM waveform are time multiplexed; and
   transforming the signal from a time domain to a frequency domain by applying a fast Fourier transform (FFT), wherein transforming the signal from the time domain to the frequency domain comprises:
      setting an initial position of an FFT window based upon an estimated channel impulse response, wherein the FFT window is to be applied to a digital representation of the signal; and
      adjusting a position of the FFT window whenever any tap of the FFT window has an energy less than either a first threshold or a second threshold multiplied by a maximum average energy.

2. The method of claim 1, wherein the OFDM waveform includes pilot tones that are staggered with respect to each other.

3. A non-transitory computer readable medium storing instructions that, when executed by a processor, cause the processor to:
   receive a signal that includes a code divisional multiplexed (CDM) waveform time multiplexed with an orthogonal frequency division modulation (OFDM) waveform; and
   transform the signal from a time domain to a frequency domain by executing instructions to further cause the processor to:
      set an initial position of a fast Fourier transform (FFT) window based upon an estimated channel impulse response, wherein the FFT window is to be applied to a digital representation of the signal; and
      adjust a position of the FFT window whenever any tap of the FFT window has an energy less than either a first threshold or a second threshold multiplied by a maximum average energy.

4. A method for comprising:
   receiving a signal that includes a radio frequency (RF) orthogonal frequency division modulation (OFDM)-modulated waveform time multiplexed with a code divisional multiplexed (CDM) waveform;
   down-converting the signal to provide an intermediate frequency (IF) signal;
   digitizing the IF signal to provide a digital signal;
   if the digitized signal includes a cyclic prefix, removing the cyclic prefix to recover a time-domain signal;
   transforming the time-domain signal in a fast Fourier transform (FFT) to recover frequency domain symbols;
   determining timing of a beginning of each of the frequency domain symbols;
   determining a starting point for the FFT;
   measuring a frequency response on an OFDM pilot tone of the signal; and
   estimating a channel impulse response, including determining a first significant component and a last significant component in an estimated channel impulse response.

5. The method of claim 4, further comprising:
   calculating the channel impulse response from the frequency response over a window between the first significant component and the last significant component;
   computing energy for each of 2P tap time-domain channel estimates of the channel impulse response;
   computing an average energy for each of the 2P tap time-domain channel estimates with respect to an infinite impulse response (IIR) filter;
   computing a second signal using each of the 2P tap time-domain channel estimates that is greater than both a first threshold and a second threshold; and
   calculating a delay spread for the 2P tap time-domain channel estimates.

6. An apparatus for transforming a signal from a time domain to a frequency domain by applying a fast Fourier transform (FFT), the apparatus comprising:
   a receiver operative to receive a signal that includes a code divisional multiplexed (CDM) waveform time multiplexed with an orthogonal frequency division modulation (OFDM) waveform; and
   a processor coupled to the receiver, the processor configured to transform the signal from a time domain to a frequency domain by executing instructions to further cause the processor to:
      set an initial position of a fast Fourier transform (FFT) window based upon an estimated channel impulse response, wherein the FFT window is to be applied to a digital representation of the signal; and
      adjust a position of the FFT window whenever any tap of the FFT window has an energy less than either a first threshold or a second threshold multiplied by a maximum average energy.

7. The apparatus of claim 6, further comprising:
a transmitter operative to provide the code divisional multiplexed (CDM) waveform in a transmit signal,
wherein the transmitter is also operative to provide the orthogonal frequency division modulation (OFDM) waveform in the transmit signal.

8. The apparatus of claim 7, wherein the transmitter is operative to include, within the OFDM waveform, pilot tones that are staggered with respect to each other.

9. An apparatus comprising:
a receiver operative to receive a signal that includes a radio frequency (RF) orthogonal frequency division modulation (OFDM)-modulated waveform time multiplexed with a code divisional multiplexed (CDM) waveform;
a down-converter operative to down-convert the signal to provide an intermediate frequency (IF) signal;
a digitizer operative to digitize the IF signal to provide a digital signal;
a cyclic prefix remover operative to remove any cyclic prefix within the digitized signal to recover a time-domain signal;
a fast Fourier transform (FFT) module operative to transform the time-domain signal to recover frequency domain symbols; and
a processor operative to:
determine a timing of a beginning of each of the frequency domain symbols;
adjust a window of the FFT module;
determine a starting point for a FFT;
measure a frequency response of an OFDM pilot tone of the signal; and
estimate a channel impulse response, including determining a first significant component and a last significant component in an estimated channel impulse response.

10. The apparatus of claim 9, wherein the processor is further operative to:
calculate the channel impulse response from the frequency response over a window between the first significant component and the last significant component;
compute energy for each of 2P tap time-domain channel estimates of the channel impulse response;
compute an average energy for each of the 2P tap time-domain channel estimates with respect to an infinite impulse response (IIR) filter;
compute a second signal using each of the 2P tap time-domain channel estimates that is greater than both a first threshold and a second threshold; and
calculate a delay spread for the 2P tap time-domain channel estimates.

11. An apparatus comprising:
a receiver means operative to receive a signal that includes a code divisional multiplexed (CDM) waveform time multiplexed with an orthogonal frequency division modulation (OFDM) waveform; and
a processor means operative to transform the signal from a time domain to a frequency domain by executing instructions to:
set an initial position of an FFT window based upon an estimated channel impulse response, wherein the FFT window is to be applied to a digital representation of the signal; and
adjust a position of the FFT window whenever any tap of the FFT window has an energy less than either a first threshold or a second threshold multiplied by a maximum average energy.

12. The apparatus of claim 11, further comprising:
transmitter means operative to provide the code divisional multiplexed (CDM) waveform in a transmit signal, wherein the transmitter means is also operative to provide the orthogonal frequency division modulation (OFDM) waveform in the transmit signal.

13. The apparatus of claim 12, wherein the transmitter means is operative to include, within the OFDM waveform, pilot tones that are staggered with respect to each other.

14. An apparatus comprising:
receiver means operative to receive a signal that includes a radio frequency (RF) orthogonal frequency division modulation (OFDM)-modulated waveform time multiplexed with a code divisional multiplexed (CDM) waveform;
down-converter means operative to down-convert the signal to provide an intermediate frequency (IF) signal;
digitizer means operative to digitize the IF signal to provide a digital signal;
cyclic prefix remover means operative to remove any cyclic prefix within the digitized signal to recover a time-domain signal;
fast Fourier transform (FFT) means operative to transform the time-domain signal to recover frequency domain symbols; and
processor means operative to:
determine a timing of a beginning of each of the frequency domain symbols;
adjust a window of the FFT means;
determine a starting point for a FFT;
measure a frequency response of an OFDM pilot tone of the signal; and
estimate a channel impulse response, including determining a first significant component and a last significant component in an estimated channel impulse response.

15. The apparatus of claim 14, wherein the processor means is further operative to:
calculate the channel impulse response from the frequency response over a window between the first significant component and the last significant component;
compute energy for each of 2P tap time-domain channel estimates of the channel impulse response;
compute an average energy for each of the 2P tap time-domain channel estimates with respect to an infinite impulse response (IIR) filter;
compute a second signal using each of the 2P tap time-domain channel estimates that is greater than both a first threshold and a second threshold; and
calculate a delay spread for the 2P tap time-domain channel estimates.

16. An apparatus comprising a processor to:
receive a signal that includes a code divisional multiplexed (CDM) waveform time multiplexed with an orthogonal frequency division modulation (OFDM) waveform; and
transform the signal from a time domain to a frequency domain by executing instructions to further cause the processor to:
set an initial position of a fast Fourier transform (FFT) window based on an estimated channel impulse response, wherein the FFT window is to be applied to a digital representation of the signal; and
adjust a position of the FFT window whenever any tap of the FFT window has an energy less than either a first threshold or a second threshold multiplied by a maximum average energy.

* * * * *